United States Patent
Lindsay et al.

[11] Patent Number: 6,084,199
[45] Date of Patent: Jul. 4, 2000

[54] PLASMA ARC TORCH WITH VENTED FLOW NOZZLE RETAINER

[75] Inventors: Jon Lindsay, West Lebanon; Stephen T. Eickhoff, Hanover; Michael W. Vandiver, Newport, all of N.H.

[73] Assignee: Hypertherm, Inc., Hanover, N.H.

[21] Appl. No.: 08/905,001

[22] Filed: Aug. 1, 1997

[51] Int. Cl.[7] .................................................. B23K 10/00
[52] U.S. Cl. .................. 219/121.52; 219/75; 219/121.5; 219/121.51
[58] Field of Search .............................. 219/121.49, 121.5, 219/121.52, 121.51, 74, 75, 121.39, 121.44, 121.59; 313/231.31, 231.41

[56] References Cited

U.S. PATENT DOCUMENTS

| | | | |
|---|---|---|---|
| 4,748,312 | 5/1988 | Hatch et al. | 219/121 PR |
| 4,861,962 | 8/1989 | Sanders et al. | 219/121.5 |
| 4,902,871 | 2/1990 | Sanders et al. | 219/121.49 |
| 5,396,043 | 3/1995 | Couch, Jr. et al. | 219/121.5 |

OTHER PUBLICATIONS

"Powermax 800"; cover sheet, 7 pgs.;(1995).

*Primary Examiner*—Mark Paschall
*Attorney, Agent, or Firm*—Testa, Hurwitz & Thibeault, LLP

[57] ABSTRACT

A flow of ionizable gas is provided to a shielded plasma arc torch which includes an electrode, a translatable nozzle, a nozzle retainer, and a shield. After passing through a heat exchanger to cool the electrode, the gas flow enters an annular chamber where the flow is divided into three subflows. A first subflow enters a plasma chamber formed by the electrode, the nozzle, and a swirl ring to pressurize the plasma chamber and support a plasma arc. The second subflow passes serially through apertures in the nozzle retainer and the shield to shield the plasma arc. The remaining flow is vented to ambient. Accordingly, a single gas flow may be employed to independently support multiple torch operating requirements.

20 Claims, 7 Drawing Sheets

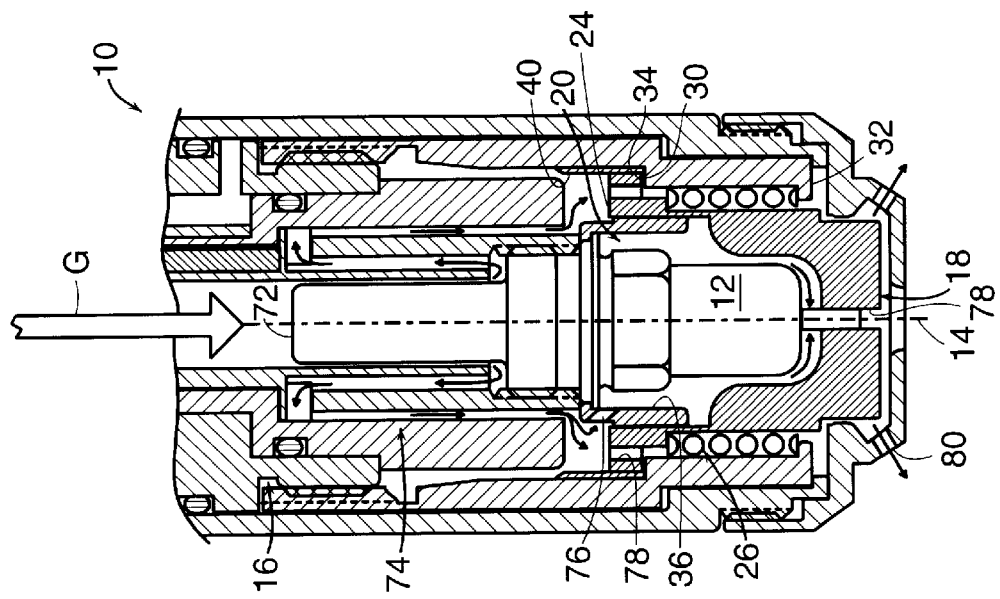
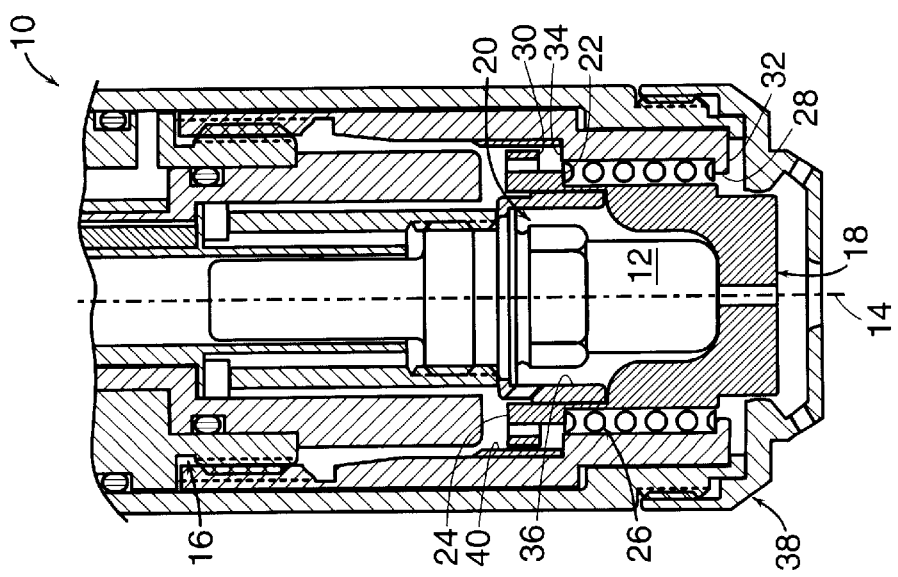

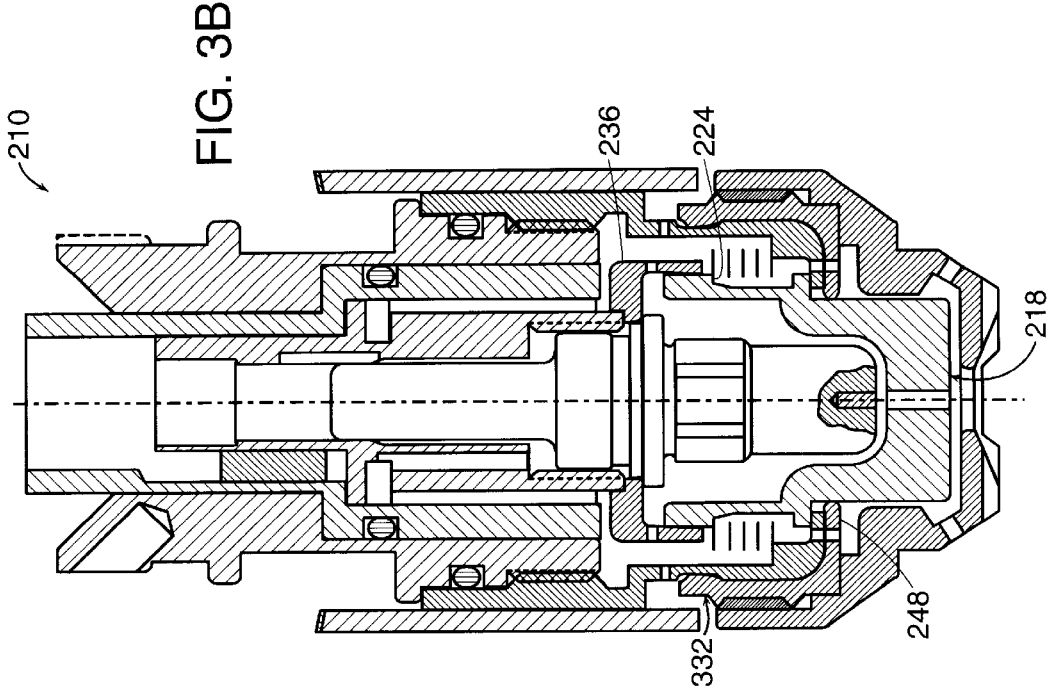
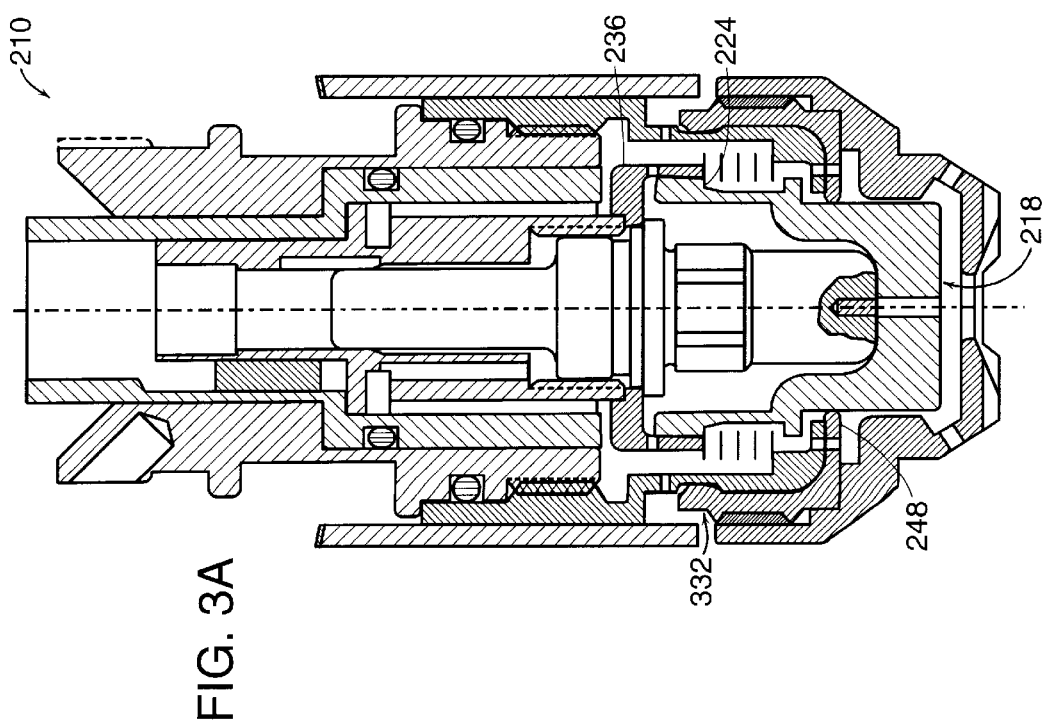

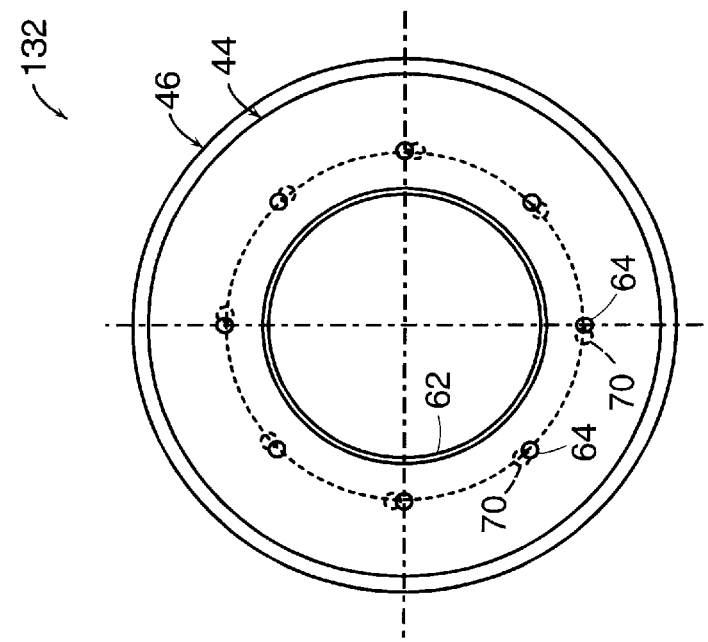
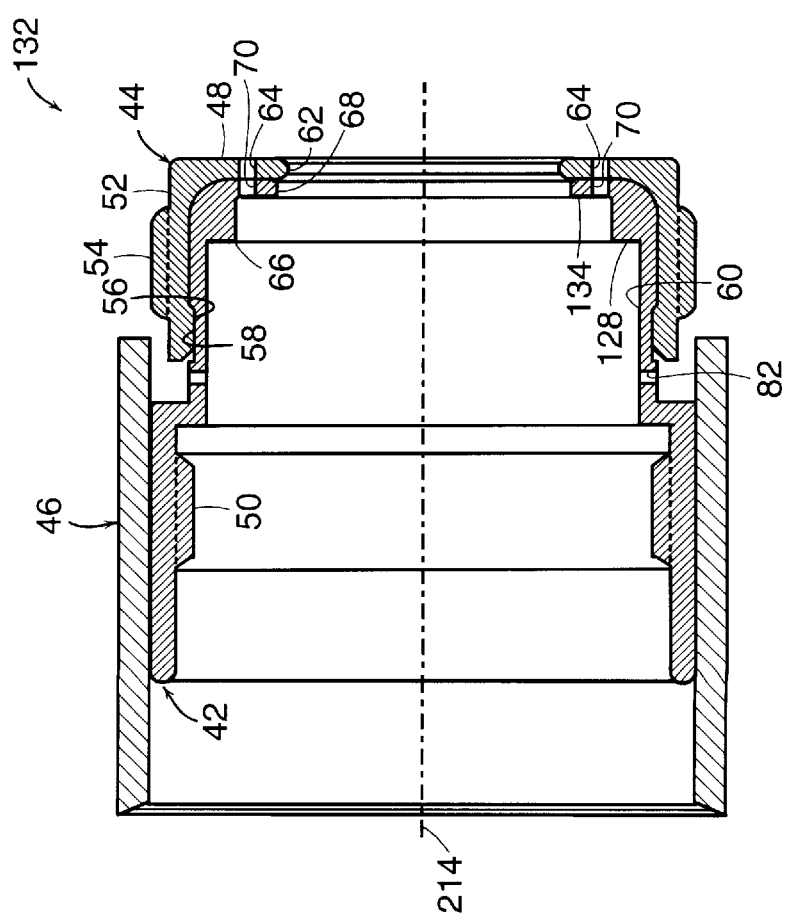

6,084,199

PLASMA ARC TORCH WITH VENTED FLOW NOZZLE RETAINER

TECHNICAL FIELD

The present invention relates to plasma arc torches and methods of operation, and more specifically, to a shielded plasma arc torch and method of gas cooling.

BACKGROUND

Plasma arc torches are widely used for cutting metallic materials. A plasma arc torch generally includes a torch body, an electrode mounted within the body, passages for cooling and arc control fluids, a swirl ring to control the fluid flow patterns, a nozzle with a central exit orifice, electrical connections, and a power supply. The torch produces a plasma arc, which is a constricted ionized jet of a plasma gas with high temperature and high momentum. A shield may also be employed to provide a shield gas flow to the area proximate the plasma arc. Gases used in the torch can be non-reactive (e.g. argon or nitrogen), or reactive (e.g. oxygen or air).

In operation, a pilot arc is first generated between the electrode (cathode) and the nozzle (anode). The pilot arc ionizes gas passing through the nozzle exit orifice. As the ionized gas reduces the electrical resistance between the electrode and the workpiece, the arc transfers from the nozzle to the workpiece. The torch may be operated in this transferred plasma arc mode, which is characterized by the conductive flow of ionized gas from the electrode to the workpiece, for the cutting of the workpiece.

Generally, there are two widely used techniques for generating a pilot plasma arc. One technique uses a high frequency, high voltage ("HFHV") signal coupled to a DC power supply and the torch. The HFHV signal is typically provided by a generator associated with the power supply. The HFHV signal induces a spark discharge in the plasma gas flowing between the electrode and the nozzle, and this discharge provides a current path. The pilot arc is formed between the electrode and the nozzle with the voltage existing across them.

The other technique for generating a pilot plasma arc is known as contact starting. Contact starting is advantageous because it does not require high frequency equipment and, therefore, is less expensive and does not generate electromagnetic interference. In one form of contact starting, the electrode is manually placed into physical and electrical contact with the workpiece. A current is then passed through the electrode to the workpiece and the arc is struck by manually retracting the electrode from the workpiece. Other contact starting systems may employ a translatable electrode in combination with a fixed nozzle, such as that disclosed in U.S. Pat. No. 4,791,268, which is assigned to the same assignee as the instant invention.

During operation of a plasma arc torch, a significant temperature rise occurs in the electrode. In systems which employ a movable electrode, passive conductive cooling of the electrode by adjacent structure is reduced due to the need to maintain sliding fit clearances therebetween. Such clearances reduce heat transfer efficiencies relative to fixed electrode designs employing threaded connections or interference fits. Accordingly, active cooling arrangements have been developed such as those disclosed in U.S. Pat. No. 4,902,871 ("the '871 patent"), which is assigned to the same assignee as the present invention. Briefly, the '871 patent describes an electrode having a spiral gas flow passage circumscribing an enlarged shoulder portion thereof. Enhanced heat transfer and extended electrode life are realized due to the increased surface area of the electrode exposed to the cool, accelerated gas flow.

SUMMARY OF THE INVENTION

An improved contact start plasma arc torch and method are disclosed in related U.S. patent application Ser. Nos. 08/727,019 and 08/727,028 which are assigned to the same assignee as the present invention. The apparatus disclosed therein includes a torch body in which an electrode is mounted fixedly. A translatable nozzle is mounted coaxially with the electrode forming a plasma chamber therebetween in cooperation with a swirl ring. The nozzle is resiliently biased into contact with the electrode by a spring element. A nozzle retainer is attached to the torch body to capture and position the nozzle. In one embodiment, a radially outwardly extending flange of the nozzle slidingly engages an annular insulator affixed to an inner wall of the nozzle retainer while a radially aligned inner surface of the nozzle flange slidingly engages the swirl ring.

Several advantages may be realized by employing a translatable nozzle in combination with a fixed electrode. For example, in cutting and marking applications, the invention provides more reliable plasma torch contact starting. In prior art designs employing a movable electrode and fixed nozzle, there are often additional moving parts and mating surfaces such as a plunger and an electrically insulating plunger housing. These parts are installed in the plasma torch and are not designed to be maintained in the field during the service life of the torch, which may be several years. These parts are subject to harsh operating conditions including rapid cycling at temperature extremes and repeated mechanical impact. In addition, in many cases the torch working fluid is compressed air, the quality of which is often poor. Oily mist, condensed moisture, dust, and debris from the air compressor or compressed air delivery line, as well as metal fumes generated from cutting and grease from the operator's hands introduced when changing consumable torch parts all contribute to the contamination of the smooth bearing surfaces permanently installed in the torch. Over time, these contaminants affect the free movement of the parts necessary to assure reliable contact starting of the pilot arc. Part movement becomes sluggish and eventually ceases due to binding, resulting in torch start failures. Many torches fail prematurely due to these uncontrollable variations in field operating conditions. These failures can be directly attributed to the degradation of the surface quality of the relatively moving parts.

One significant advantage of employing a translatable nozzle in combination with a fixed electrode is the use of moving parts and mating surfaces which are routinely replaced as consumable components of the torch. In this manner, critical components of the torch contact starting system are regularly renewed and torch performance is maintained at a high level. Additionally, a high integrity electrical connection with the electrode can be maintained, which is especially important at higher currents associated with operation of the torch in the transferred arc mode.

A translatable nozzle torch also provides enhanced conductive heat transfer from the hot electrode to cool the electrode more efficiently. In prior art contact start systems with a movable electrode, because the electrode must move freely with respect to mating parts, clearance is required between the electrode and proximate structure. This requirement limits the amount of passive heat transfer from the electrode into the proximate structure. In a translatable nozzle torch, the electrode, which is the most highly thermally stressed component of the plasma torch, is securely fastened to adjacent structure which acts as an effective heat sink. The intimate contact greatly reduces interface thermal resistivity and improves electrode conductive cooling efficiency. As a result, the better cooled electrode will generally have a longer service life than a prior art electrode subject to similar operating conditions. A single gas flow may be provided to the torch and used initially to cool the electrode. Thereafter, the gas flow may be divided into a first subflow, to pressurize the plasma chamber and support the plasma arc, and a second subflow to shield the plasma arc.

While plasma arc torches manufactured according to the teachings of the related applications, U.S. Ser. Nos. 08/727,019 and 08/727,028, function as intended, improvements have been developed to facilitate manufacture, extend component life, and enhance contact start system reliability.

According to the present invention, an improved contact start plasma arc torch and method of operating a shielded plasma arc torch with a translatable nozzle are useful in a wide variety of industrial and commercial applications including, but not limited to, cutting and marking of metallic workpieces, as well as plasma spray coating. The apparatus includes a torch body in which an electrode is mounted fixedly. A translatable nozzle is mounted coaxially with the electrode forming a plasma chamber therebetween in cooperation with a swirl ring. A nozzle retainer including a retaining cap, a nozzle bearing, and an outer sleeve is attached to the torch body to capture and position the nozzle. A spring element is disposed between the nozzle retainer and a radially outwardly extending flange of the nozzle to bias the nozzle in a direction of contact with the electrode. An outer shield is affixed to the nozzle retainer to direct a shield gas flow around the plasma arc.

A flow of ionizable gas first passes through a concentric annular heat exchanger in thermal communication with the electrode in the torch body to cool the electrode. Thereafter, the flow enters an annular chamber where the flow is divided into three subflows. A first subflow passes through at least one aperture in the swirl ring to pressurize the plasma chamber and support the plasma arc. Throttling of the first subflow occurs at a centrally disposed orifice of the nozzle through which the plasma arc emerges from the torch. The second subflow passes through and is throttled by at least one aperture in the nozzle retainer. The second subflow provides a shield gas which passes through a series of apertures in the shield to shield the plasma arc. The remaining third subflow passes through at least one aperture in the nozzle retainer and is vented to ambient. Plasma arc and shield gas flows may therefore be controlled independently of total gas flow, affording the capability to enhance electrode cooling without adversely affecting torch performance.

In an alternative embodiment a first flow of gas first passes through a concentric annular heat exchanger in thermal communication with the electrode in the torch body to cool the electrode. Thereafter, the flow enters an annular chamber where the flow is divided into two subflows. A first subflow passes through and is throttled by at least one aperture in the nozzle retainer. The first subflow provides a shield gas which passes through a series of apertures in the shield to shield the plasma arc. The remaining subflow passes through at least one aperture in the nozzle retainer and is vented to ambient. An independent second flow of gas passes through at least one aperture in the swirl ring to pressurize the plasma chamber and support the plasma arc. Throttling of the second flow occurs at a centrally disposed orifice of the nozzle through which the plasma arc emerges from the torch. Plasma arc and shield gas flows may therefore be controlled independently of each other and the amount of shield gas flow itself may be controlled independently of the gas flow required to cool the electrode. This method affords the capability to enhance electrode cooling without adversely affecting torch performance.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which:

FIG. 1A is a schematic sectional view of a related plasma arc torch working end portion in a de-energized mode;

FIG. 1B is a schematic sectional view of the related plasma arc torch working end portion depicted in FIG. 1A in a pilot arc mode;

FIG. 3A is a schematic sectional view of a plasma arc torch working end portion depicted in a de-energized mode in accordance with an alternative embodiment of the present invention;

FIG. 3B is a schematic sectional view of the plasma arc torch working end portion depicted in FIG. 3A in a pilot arc mode;

FIG. 4A is a schematic sectional side view of the nozzle retainer depicted in FIG. 2A;

FIG. 4B is a schematic end view of the nozzle retainer depicted in FIG. 4A;

DETAILED DESCRIPTION

Figure 2B:
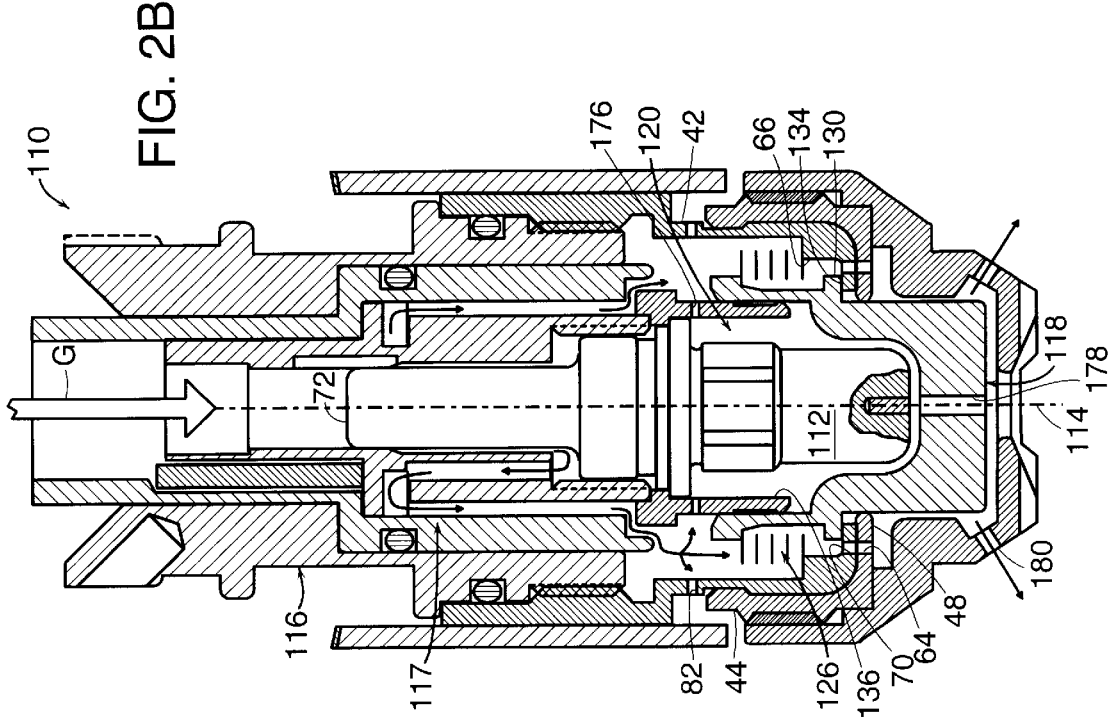
FIG. 2B is a schematic sectional view of the plasma arc torch working end portion depicted in FIG. 2A in a pilot arc mode.

FIG. 1A depicts a schematic sectional view of a working end portion of a related plasma arc torch 10 in a de-energized mode. The torch 10 includes a nozzle 18 biased into abutting relationship with a centrally disposed electrode 12 by a spring element 26, depicted here as a helical compression spring. The various elements of the torch 10 are disposed generally symmetrically about and colinearly with a longitudinal axis 14 of the torch 10. The nozzle 18 is of unitary construction and includes a longitudinal step 22 on radially outwardly extending flange 24 against which the spring element 26 reacts. The spring element 26 also reacts against a step 28 of the nozzle retainer 32. The nozzle 18 further includes a radially outwardly extending flange 30 radially aligned with a nozzle retainer step 34, the longitudinal clearance therebetween defining the limit of travel of the nozzle 18 when annular plasma chamber 20 is pressurized. The plasma chamber 20 is bounded by the electrode 12, the nozzle 18, and a swirl ring 36. To assemble the torch 10, the nozzle 18 is disposed over the mounted electrode 12 and the swirl ring 36, the spring element 26 is inserted, and the nozzle retainer 32 is attached to the torch body 16 by a threaded connection or other means. The free state length of spring element 26 and assembled location of nozzle retainer step 28 and nozzle step 22 are predetermined to ensure a desired spring element preload at assembly. The torch 10 also includes a gas shield 38 which is installed thereafter for channeling airflow around the nozzle 18 and the plasma arc.

The torch 10 includes an optional electrical insulator 40 disposed radially between nozzle retainer 32 and nozzle flange 30. The insulator 40 may be affixed to the nozzle retainer 32 by radial interference fit, bonding, or other method. An exemplary material is VESPEL™, available from E.I. du Pont de Nemours & Co., Wilmington, Del. 19898. By providing the insulator 40 between the nozzle flange 30 and the nozzle retainer 32, micro-arcing and associated distress along the sliding surfaces thereof during translation of the nozzle 18 is prevented which otherwise could tend to bind the nozzle 18. To provide a reliable electrical current path through the spring element 26 during pilot arc initiation, a helical metal compression spring with flat ground ends may be employed as depicted. The spring should be made of a non-oxidizing material such as stainless steel and need only support initial current flow between the nozzle 18 and the nozzle retainer 32 during nozzle translation because at full nozzle travel, nozzle flange 30 abuts nozzle retainer step 34 as depicted in FIG. 1B. The torch configuration in the pilot arc state with the plasma chamber 20 pressurized and the nozzle 18 at full travel is depicted in FIG. 1B.

As is apparent from FIGS. 1A and 1B, the nozzle 18 is supported for translation by radially aligned portions of the nozzle retainer 32 and the swirl ring 36. Specifically, the radially outwardly extending nozzle flange 30 slidingly engages the annular insulator 40 affixed to an inner wall of the nozzle retainer 32 while a radially aligned inner surface of the nozzle flange 30 slidingly engages the swirl ring 36.

Figure 2A:
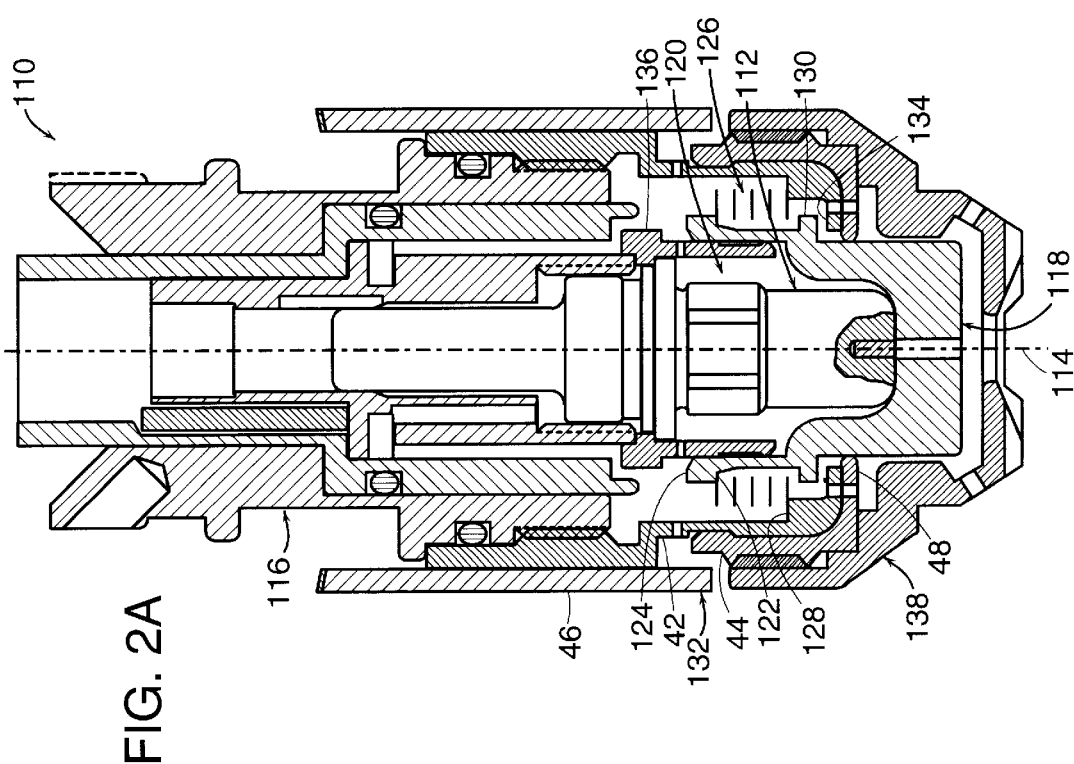
FIG. 2A is a schematic sectional view of a plasma arc torch working end portion depicted in a de-energized mode in accordance with an embodiment of the present invention.

Referring now to FIG. 2A, a schematic sectional view of a working end portion of a plasma arc torch 110 according to the invention is depicted in a de-energized mode. The torch 110 includes a nozzle 118 biased into abutting relationship with a centrally disposed electrode 112 by a spring element 126, depicted here schematically as a series of parallel lines. The various elements of the torch 110 are disposed generally symmetrically about and colinearly with a longitudinal axis 114 of the torch 110. The nozzle 118 may be manufactured of unitary construction or alternatively may include a retainer collar as disclosed in the related applications, U.S. Ser. Nos. 08/727,019 and 08/727,028. The nozzle 118 includes a longitudinal step 122 on radially outwardly extending flange 124 against which the spring element 126 reacts. The spring element 126 also reacts against a step 128 of the nozzle retainer 132. The nozzle retainer 132 is an assembly of a retaining cap 42, a nozzle bearing member 44, and an outer sleeve 46, as will be discussed in greater detail hereinbelow with respect to FIGS. 4A and 4B. Nozzle 118 further includes a radially outwardly extending flange 130 radially aligned with a nozzle retainer step 134, the longitudinal clearance therebetween defining the limit of travel of the nozzle 118 when the annular plasma chamber 120 is pressurized. The plasma chamber 120 is bounded by the electrode 112, the nozzle 118, and a swirl ring 136. To assemble the torch 110, the nozzle 118 is disposed over the mounted electrode 112 and the swirl ring 136. In the embodiment depicted, the spring element 126 is integral with the nozzle 118, being captured between the flanges 124, 130. The nozzle retainer 132 is attached to the torch body 116 by a threaded connection, as depicted, or other suitable means. The free state length of spring element 126 and assembled location of the retainer step 128 and the nozzle step 122 are predetermined to ensure a desired spring element preload at assembly. The torch 110 also includes a gas shield 138 which is installed thereafter for channeling airflow around the nozzle 118 and the plasma arc.

The nozzle bearing member 44 of the nozzle retainer 132 includes a radially inwardly extending flange 48 at a forward end thereof. The flange 48 forms a centrally disposed aperture generally centered along the torch longitudinal axis 114 for radially locating the nozzle 118. The aperture is sized to support a generally constant diameter forward outer wall surface of the nozzle 118 in close fitting, sliding contact relation. The nozzle bearing member 44 may be affixed to the retaining cap 42 by radial interference fit, bonding, or other method. An exemplary material is VESPEL™. By supporting the nozzle 118 at a forward location with an electrically insulative material, micro-arcing and associated distress along the sliding surfaces thereof during translation of the nozzle 118 is prevented which otherwise could tend to bind the nozzle 118. To provide a reliable electrical current path through the spring element 126 during pilot arc initiation, one or more wave spring washers or a suitable equivalent may be employed. The spring element 126 should be made of a non-oxidizing material such as stainless steel and need only support initial current flow between the nozzle 118 and the nozzle retainer 132 during nozzle translation because at full nozzle travel, the nozzle flange 130 abuts the step 134 of the retaining cap 42 as depicted in FIG. 2B. The retaining cap 42 may be manufactured from an electrically conductive material such as brass. The torch configuration in the pilot arc state with the plasma chamber 120 pressurized and the nozzle 118 at full travel is depicted in FIG. 2B.

As is apparent from FIGS. 2A and 2B, the nozzle 118 is supported for translation by longitudinally spaced portions of the nozzle retainer 132 and the swirl ring 136. Specifically, the radially inwardly extending bearing member flange 48 slidingly engages the cylindrical outer wall surface of a forward portion of the nozzle 118 while a longitudinally rearwardly disposed swirl ring 136 slidingly engages a generally cylindrical aft inner wall surface of the nozzle 118 proximate nozzle flange 124.

According to an alternative embodiment of the invention, a plasma arc torch 210 is depicted in a de-energized mode and in a pilot arc mode in FIGS. 3A and 3B, respectively. The structure of the torch 210 is similar to the structure of torch 110 with a nozzle 218 of the torch 210 being supported for translation by longitudinally spaced portions of a nozzle retainer 332 and a swirl ring 236. A radially inwardly extending bearing member flange 248 of the nozzle retainer 332 slidingly engages a cylindrical outer wall surface of a forward portion of the nozzle 218 while a longitudinally rearwardly disposed swirl ring 236 slidingly engages a generally cylindrical aft outer wall surface of the nozzle 218 proximate nozzle flange 224.

FIGS. 4A and 4B are a schematic sectional side view and a schematic end view, respectively, of the nozzle retainer 132 depicted in FIGS. 2A and 2B. As mentioned hereinabove, the nozzle retainer 132 includes a retaining cap 42, a nozzle bearing member 44, and an outer sleeve 46 forming an assembly. Each of the cap 42, the bearing member 44, and the sleeve 46 have first and second ends defining a longitudinal axis 214 of substantial symmetry which is substantially coincident with torch longitudinal axis 114 when the nozzle retainer 132 is assembled to the torch body 116 along cap threads 50. The bearing member 44 includes a generally cylindrical annular wall 52 having the radially inwardly directed flange 48 extending therefrom. A generous internal radius is provided at the junction of the flange 48 and the wall 52 to provide structural integrity to the bearing member 44. Threads 54 are provided along an exterior portion of the wall 52 for threaded engagement with mating threads of the shield 138 as depicted in FIG. 2A.

While the bearing member 44 could be mounted to the retaining cap 42 by any of a variety of techniques including bonding, threading, press fitting, and the like, an exemplary technique is a contoured radial interference fit. By varying an inner diameter of the wall 52 as a function of position along the longitudinal axis 214, a localized minimum diameter portion 56 can be generated, in this case, at a longitudinal end of the wall 52 remote from the flange 48. Upon pressing the bearing member 44 longitudinally over the retaining cap 42, the bearing member wall 52 is expanded elastically until the minimum diameter portion 56 mates with a matching contoured minimum outer diameter portion 58 of a generally cylindrical annular wall 60 of the retaining cap 42, interlocking the bearing member 44 and the retaining cap 42. To prevent relative rotation between the bearing member 44 and the cap 42 and to enhance the structural integrity of the assembly, the outer diameter of the cap wall 60 may be modified by roughening or knurling, for example, to provide a radial interference fit. The sleeve 46 may be made from an electrically insulative material such as a fiberglass reinforced epoxy and press fit over an aft portion of the retaining cap 42 to provide a grip for threading the nozzle retainer 132 to the torch body 116 and to cover the electrically conductive cap 42 to prevent an electrical shock hazard to a user of the torch 110.

The radial flange 48 of the bearing member 44 forms a first aperture 62 generally centered on the longitudinal axis 214 for radially locating the nozzle 118. In an exemplary embodiment, radial clearance between the nozzle 118 and the flange 48 may be on the order of thousandths of an inch and the contact surface of the flange 48 may have a longitudinal length on the order of thousandths of an inch. The flange 48 may be bounded on forward and aft sides by 45 degree chamfers. Wear debris is effectively ejected from the sliding contact surface, instead of being captured and potentially binding the nozzle 118.

The radial flange 48 also forms a plurality of second apertures 64 radially offset from the nozzle aperture 62 for directing a gas flow to the shield 138 as will be discussed in greater detail hereinbelow. In an exemplary embodiment, eight shield gas apertures 64 of similar diameter are disposed at a substantially constant radius from the longitudinal axis 214 at substantially equi-spaced circumferential locations. Each shield gas aperture 64 defines an aperture axis oriented substantially skew to the longitudinal axis 214. In other words, the shield gas aperture axes are not parallel to nor do they intersect the longitudinal axis 214. As is best seen in FIG. 4B, the shield gas aperture axes are canted in a circumferential direction, inducing a swirling flow in the shield 138. Depending on a particular application, fewer or greater number of shield gas apertures 64 may be formed. In an exemplary embodiment, the shield gas apertures 64 may be on the order of hundredths of an inch in diameter and skewed circumferentially by several percent. Aperture diameter, radial location, circumferential spacing, and axis orientation may be modified, as desired, to suit a particular application.

In order to support and provide for positive longitudinal location of the bearing member flange 48, a flange 66 extends radially inwardly from the cap wall 60. The mating flange 66 includes a generous external radius slightly smaller than that of the bearing flange 48.

The flange 66 also includes the travel limiting step 134 for the nozzle 118, and the reaction step 128 for the spring element 126. To provide for unrestricted passage of the nozzle 118 therethrough, the flange forms a first aperture 68 having an inner diameter greater than that of the nozzle aperture 62 of the bearing member 44. Also, a common plurality of second apertures 70 are formed by the cap flange 66 to match the shield gas apertures 64 of the bearing member flange 48 in order to provide unrestricted flow of the shield gas therethrough. To preclude problems with aperture registration, the nozzle retainer 132 may be manufactured by first mounting the bearing member 44 to the retaining cap 42 and thereafter, drilling through both flanges 48, 66 to form the apertures 64, 70 simultaneously.

Figure 5B:
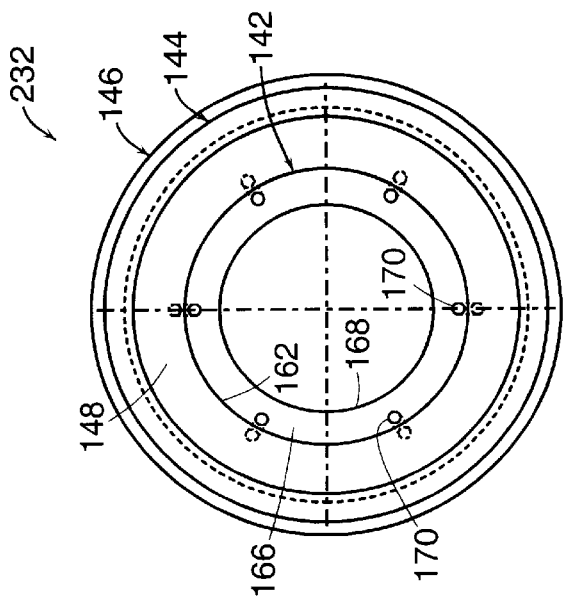
FIG. 5B is a schematic end view of the prior art nozzle retainer depicted in FIG. 5A.
Figure 5A:
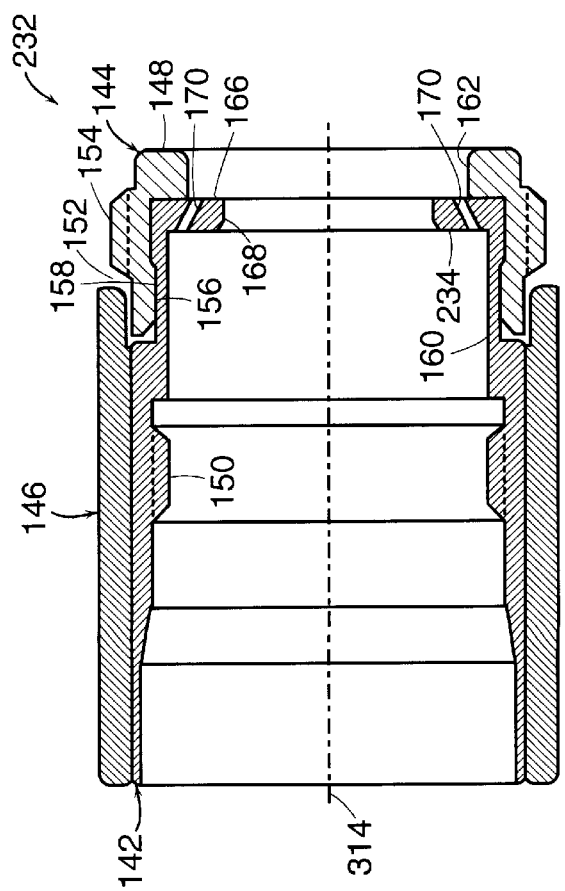
FIG. 5A is a schematic sectional side view of a prior art nozzle retainer.

FIGS. 5A and 5B are a schematic sectional side view and a schematic end view, respectively, of a prior art nozzle retainer 232 employed in a shielded plasma arc torch utilizing a fixed, non-translatable nozzle. The nozzle retainer 232 includes a retaining cap 142, a shield mount 144, and an outer sleeve 146 forming an assembly. Each of the cap 142, the mount 144, and the sleeve 146 have first and second ends defining a longitudinal axis 314 of symmetry. The cap 142 is assembled to a torch body along cap threads 150. The mount 144 is manufactured from an electrically insulative material and includes a generally cylindrical annular wall 152 having a radially inwardly directed flange 148 extending therefrom. A sharp internal radius is provided at the junction of the flange 148 and the wall 152. Threads 154 are provided along an exterior portion of the wall 52 for threaded engagement with mating threads of a shield.

The shield mount 144 is mounted to the retaining cap 142 by a contoured radial interference fit. A localized minimum diameter portion 156 of the wall 152 mates with a matching contoured minimum outer diameter portion 158 of an annular wall 160 of the retaining cap 142. The sleeve 146 is made from an electrically insulative material and press fit over the retaining cap 142.

The radial flange 148 of the bearing member 144 forms a first aperture 162 generally centered on the longitudinal axis 214 for clearance. A flange 166 extends radially inwardly from the cap wall 160 forming a first oversized aperture 168 and an aft facing step 234 to merely capture a fixed, non-translatable nozzle. A plurality of second apertures 170 are formed by the cap flange 166 to provide a flow path for shield gas. Each shield gas aperture 170 defines an aperture axis oriented to intersect the longitudinal axis 314. As is best seen in FIG. 5B, the shield gas aperture axes are canted in a radial direction so as not to induce a swirling flow in the shield.

Referring once again to FIG. 1B, a flow of gas, G, is channeled through the body 16 of the torch 10 in a forward direction, first impinging on an aft tailstock 72 of the electrode 12. The gas flow G reverses direction twice through a concentric annular heat exchange configuration shown generally at 74 to cool the electrode 12. Upon exiting the heat exchanger 74, the flow is divided into a first subflow which enters the plasma chamber 20 through a plurality of apertures 76 (solely one of which is depicted) formed in the swirl ring 36 and a second subflow which travels in a forward direction through apertures 78 formed in nozzle flange 30. The first subflow pressurizes the plasma chamber 20, translating the nozzle 18 in a forward direction and providing the gas flow to sustain the plasma arc. The first subflow exits the torch 10 through a nozzle orifice 78. The second subflow travels forward in the annulus formed by the nozzle 18 and the nozzle retainer 32 in which is disposed the spring element 26. The second subflow exits the torch through a plurality of shield apertures 80 to enshroud the plasma arc.

Referring now to FIG. 2B, a flow of gas, G, is channeled through the body 116 of the torch 110 in a forward direction, first impinging on an aft tailstock 172 of the electrode 112. The gas flow G reverses direction twice through a concentric annular heat exchange configuration shown generally at 174 to cool the electrode 112. Upon exiting the heat exchanger 174, the gas flow G is divided into: (i) a first subflow which enters the plasma chamber 120 through apertures 176 formed in the swirl ring 136; (ii) a second subflow which travels in a forward direction through an annulus formed by the nozzle 118 and the retaining cap 42 in which is disposed the spring element 126; and (iii) a third subflow or remaining flow which passes through a series of vent apertures 82 formed in the wall 60 of the retaining cap 42. The first subflow pressurizes the plasma chamber 120, translating the nozzle 118 in a forward direction and providing the gas flow to sustain the plasma arc. The first subflow exits the torch 110 through a nozzle orifice 178. Translation of the nozzle 118 and abutment of the nozzle flange 130 with the cap step 134 seal the annulus formed by the nozzle 118 and the retaining cap 42 such that the second subflow passes through the shield gas apertures 64, 70 formed in nozzle bearing flange 48 and cap flange 66, respectively. The second subflow exits the torch through a plurality of shield apertures 180 to enshroud the plasma arc. The remaining flow is vented to ambient via vent apertures 82.

Division of the gas flow G into the three constituent flows is controlled by sizing flow passages such as apertures within the torch components to throttle each subflow as desired. For example, the first subflow which pressurizes the plasma chamber 120 and supports the plasma arc is throttled by the nozzle orifice 178 to produce a stable plasma arc, not by the swirl ring apertures 176. A primary function of the swirl ring apertures 176 is to induce a swirling flow within the plasma chamber 120 for facilitating arc stability and control. The second subflow, which provides a shield gas flow, is throttled by contiguous shield gas apertures 64, 70 in the nozzle retainer 132 and not the shield apertures 80. Lastly, the vent apertures 82 in the retaining cap 42 are generally sized sufficiently large so as not to adversely influence the throttling of the plasma arc flow and the shield flow. Accordingly, the volumetric flow rate of the gas flow G through the torch body 116 can be increased as necessary to provide the necessary degree of cooling of the electrode 112 and proximate structure without affecting operation of the torch 110. In the case of the dual split flow of torch 10 in FIG. 1B, an increase in total gas flow G through the torch body 16 to enhance cooling of the electrode 12 can result in excess shield flow which would detrimentally affect torch performance and in extreme cases could quench the plasma arc altogether. With the vented flow configuration of torch 110 in FIG. 2B, excess flow is benign, being vented to ambient. Accordingly, cooling of the electrode 112 with concomitant extension of electrode life can be substantially decoupled from the performance of the torch 110, even though a single gas flow supports all three functions. The vented flow configuration of the torch 110 is not limited to torches employing translatable nozzles, but rather may be employed advantageously in any shielded torch, as discussed hereinbelow with respect to FIGS. 6A and 6B.

Testing was conducted to ascertain the influence of the addition of vent flow on torch performance. Measured performance parameters included maximum cut speed, quantity of dross, lag angle, and cut angle. As is known by those skilled in the art, dross is molten material which has resolidified at the bottom or exit of the kerf, lag angle is an angle of cut measured from top to bottom of the kerf when viewed from a location generally perpendicular to the direction of cut, and cut angle is an angle of cut measured from top to bottom of the kerf when viewed from a location generally collinear with the direction of cut.

Utilizing an unvented shielded torch rated at 80 amperes with eight equi-spaced circumferentially disposed shield apertures 180 each having an equivalent nominal diameter, maximum cut speed was about 20 inches per minute (51 cm/min). By adding four generally circumferentially equi-spaced radial vent apertures 82 to the retaining cap 42 at a common longitudinal location, each having an equivalent nominal diameter, maximum cut speed was increased about 25 percent to about 25 inches per minute (64 cm/min) without detrimental impact on quantity of dross, lag angle, or cut angle. Torch operating parameters were kept substantially constant; however, in order to maintain plasma chamber pressure and subflow constant, the nominal diameter of each shield aperture 180 was reduced slightly so that the flow split pressure in the annulus in which the spring element 126 is located could be maintained substantially constant.

Figure 6A:
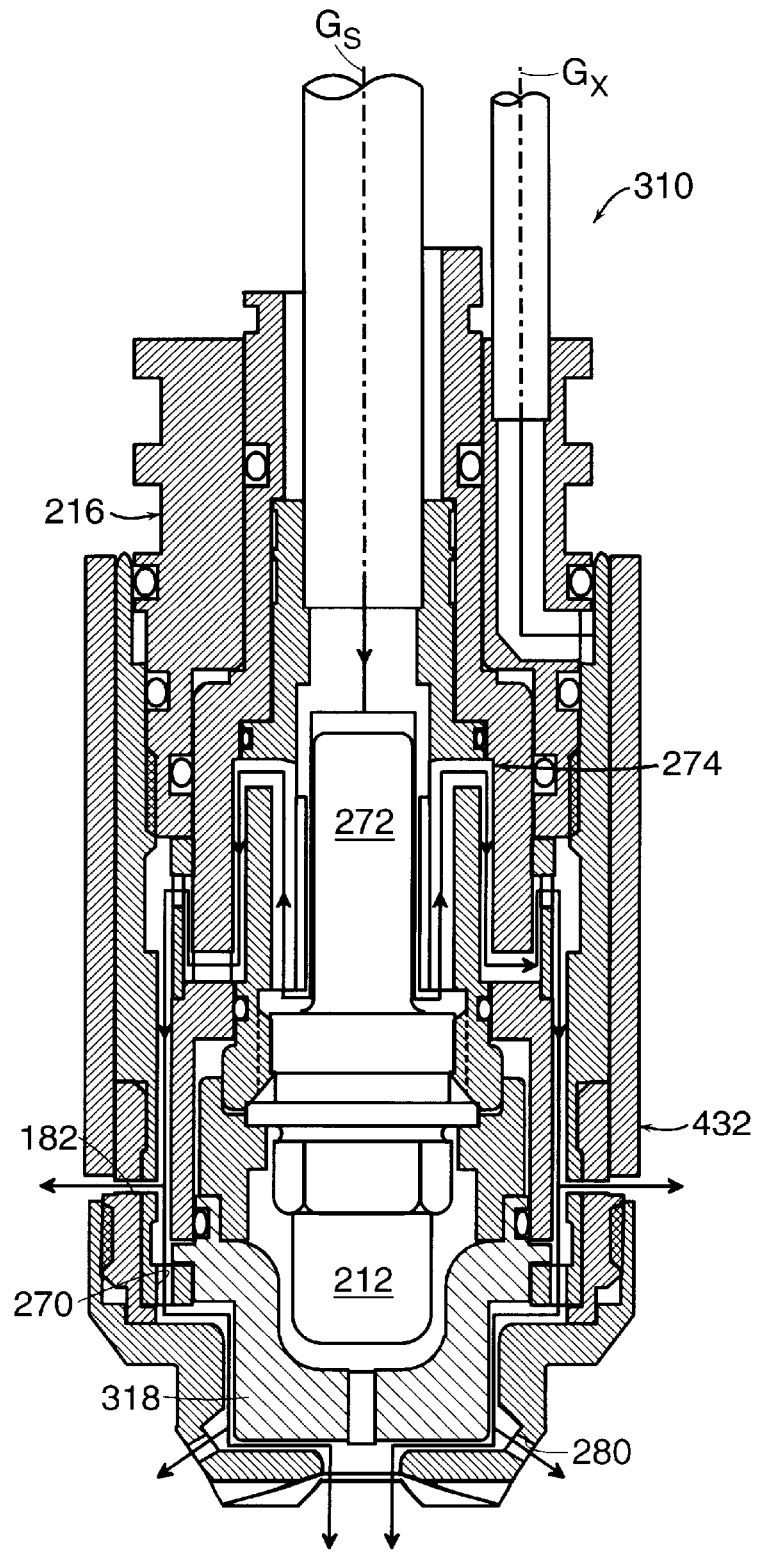
FIG. 6A is a schematic sectional view of a plasma arc torch working end portion in accordance with another alternative embodiment of the present invention.
Figure 6B:
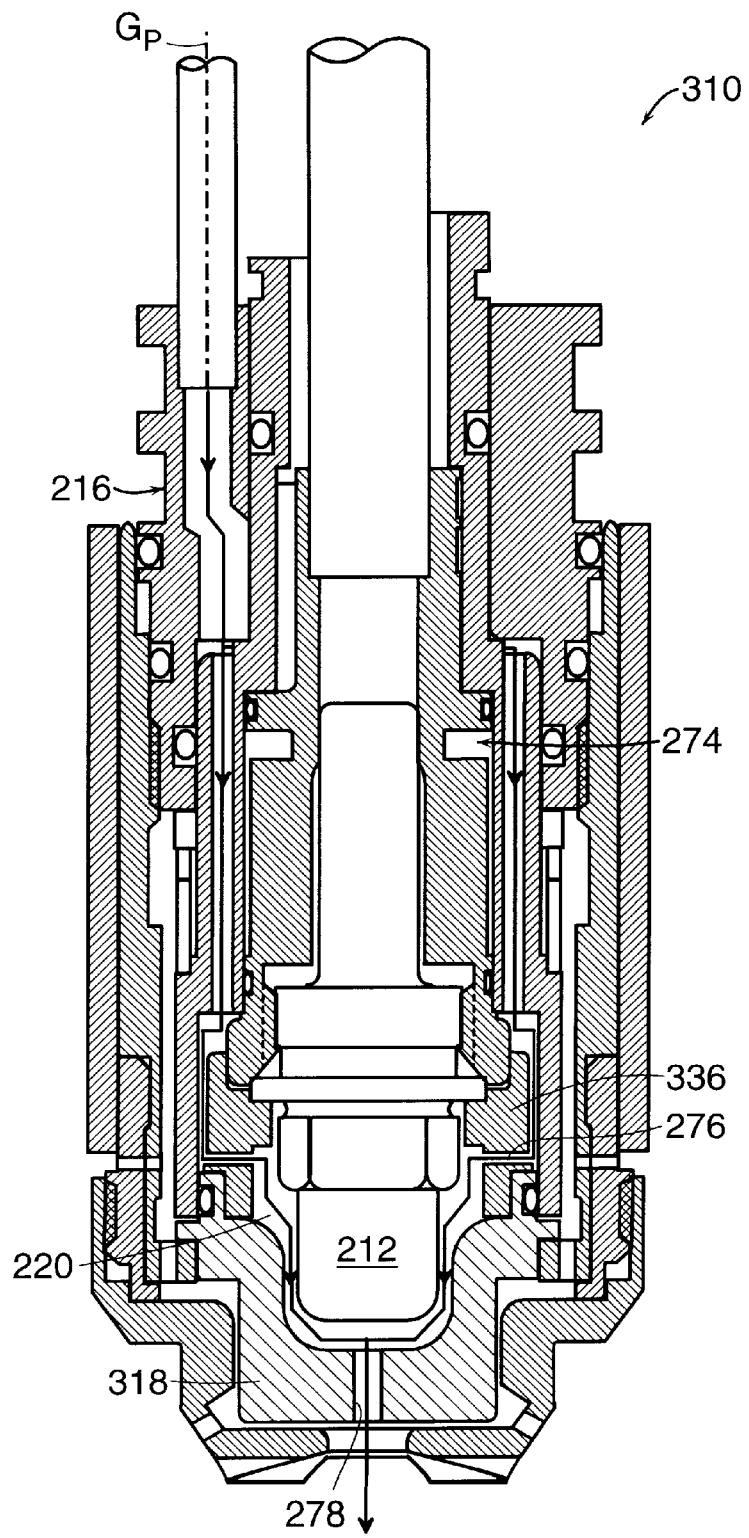
FIG. 6B is a different schematic sectional view of the plasma arc torch working end portion depicted in FIG. 6A.

The benefits associated with the vented flow configurations discussed hereinabove are not limited to torches having a single flow of gas, G. For example, depicted in FIGS. 6A and 6B are different schematic sectional views of a plasma arc torch 310 having a fixed nozzle 318 and dual, independent shield and plasma arc gas flows, $G_S$, $G_P$. Referring first to FIG. 6A, a flow of shield gas, $G_S$, is channeled through a body 216 of the torch 310 in a forward direction, first impinging on an aft tailstock 272 of an electrode 212. The shield gas flow $G_S$ reverses direction twice through a concentric annular heat exchange configuration shown generally at 274 to cool the electrode 212. Upon exiting the heat exchanger 274, the shield gas flow $G_S$ is divided into: (i) a first subflow which travels in a forward direction through a series of apertures 270 disposed in a nozzle retainer 432; and (ii) a second subflow or remaining flow which passes through a series of vent apertures 182 formed in a wall of the nozzle retainer 432. The first subflow exits the torch 310 through a plurality of shield apertures 280 to enshroud the plasma arc. The remaining flow is vented to ambient via vent apertures 182.

Referring now to FIG. 6B, a second, independent flow of ionizable plasma arc gas, $G_P$, is channeled through the body 216 of the torch 310 in a forward direction radially outwardly of the heat exchanger 274. All of the plasma arc gas flow, $G_P$, enters a plasma chamber 220 bounded by the electrode 212, the nozzle 318, and a swirl ring 336 through apertures 276 formed in the swirl ring 336. The plasma arc gas flow, $G_P$, pressurizes the plasma chamber 220, providing the ionizable gas flow to sustain the plasma arc. Plasma arc gas flow, $G_P$, is throttled by and exits the torch 310 through a nozzle orifice 278.

The torch may also have a third independent gas flow, $G_X$, depicted in FIG. 6A. The third gas flow, $G_X$, is not used for cutting or cooling, but rather may be used as part of a fail-safe system to prevent energization of a plasma arc torch power supply in the event the nozzle retainer 432 is not assembled to the torch body 216. This precludes the possibility of a user receiving an electrical shock from an exposed electrode 212.

Division of the shield gas flow, $G_S$, into the two constituent flows is controlled by sizing flow passages such as apertures within the torch components to throttle each subflow as desired. For example, the first subflow, which shields the plasma arc, is throttled by shield gas apertures 270 in the nozzle retainer 432 and not the shield apertures 280. The vent apertures 182 in the nozzle retainer 432 are generally sized sufficiently large so as not to adversely influence the shield flow. Accordingly, the volumetric flow rate of the shield gas flow, $G_S$, through the torch body 216 can be increased as necessary to provide the necessary degree of cooling of the electrode 212 and proximate structure without affecting operation of the torch 310. With the vented flow configuration of torch 310, excess flow is benign, being vented to ambient. Accordingly, cooling of the electrode 112 with concomitant extension of electrode life can be substantially decoupled from the performance of the torch 310, even though a single gas flow both cools the electrode 212 and shields the plasma arc.

While there have been described herein what are to be considered exemplary and preferred embodiments of the present invention, other modifications of the invention will become apparent to those skilled in the art from the teachings herein. For example, instead of being attached to the nozzle 118, the spring element 126 could be captured between opposed flanges of the nozzle retainer 132. Alternatively, the spring element 126 may be a separate element from both the nozzle 118 and the retainer 132. Additionally, the vent flow may be employed in any shielded torch to decouple cooling of the electrode 112 from plasma chamber and shield gas subflows. The shielded torch may have any combination of fixed and translatable components including electrodes, nozzles, and swirl rings. The particular methods of manufacture of discrete components and interconnections therebetween disclosed herein are exemplary in nature and not to be considered limiting. It is therefore desired to be secured in the appended claims all such modifications as fall within the spirit and scope of the invention. Accordingly, what is desired to be secured by Letters Patent is the invention as defined and differentiated in the following claims.

What is claimed is:

1. A method of operating a shielded plasma arc torch comprising the steps of:
   providing a flow of an ionizable gas to a torch body;
   passing the flow through a heat exchanger in thermal communication with an electrode disposed in the torch body;
   dividing the flow thereafter into:
      a first subflow for passage through a plasma chamber formed between the electrode and a nozzle to sustain a plasma arc;
      a second subflow for passage through a shield to shield the plasma arc; and
      a remaining flow; and
   venting the remaining flow to ambient remote from the plasma arc through at least one aperture formed in a nozzle retainer side wall.

2. The invention according to claim 1 wherein the first subflow passes through at least one aperture formed by a swirl ring bounding the plasma chamber, at least in part.

3. The invention according to claim 1 wherein the first subflow is throttled by an orifice formed in the nozzle.

4. The invention according to claim 1 wherein the second subflow passes through and is throttled by at least one aperture formed in a nozzle retainer flange.

5. A method of operating a shielded plasma arc torch comprising the steps of:
   providing a first flow of a gas to a torch body;
   passing the first flow through a heat exchanger in thermal communication with an electrode disposed in the torch body;
   dividing the flow thereafter into:
      a first subflow for passage through a shield to shield a plasma arc; and
      a remaining flow; and
   venting the remaining flow to ambient remote from the plasma arc through at least one aperture formed in a nozzle retainer side wall.

6. The invention according to claim 5 further comprising the step of providing a second flow of an ionizable gas to pressurize a plasma chamber formed between the electrode and a nozzle to sustain a plasma arc.

7. A plasma arc torch nozzle retainer comprising:
   a retaining cap comprising:
      a generally cylindrical wall having a first end and a second end defining a longitudinal cap axis; and
      a radially inwardly directed flange extending from the wall, the flange forming:
         a first aperture generally centered along the cap axis for permitting passage therethrough of a nozzle; and
         a second aperture radially offset from the first aperture for passage therethrough of a shield gas flow;
      wherein the wall forms a third aperture spaced from the second aperture for passage therethrough of a vent gas flow to ambient remote from a plasma arc.

8. The invention according to claim 7 wherein the second aperture defines an aperture axis which is oriented substantially skew relative to the cap axis.

9. The invention according to claim 7 wherein the flange further forms a plurality of second apertures radially offset from the first aperture.

10. The invention according to claim 9 wherein the plurality of second apertures are formed at a substantially constant radial dimension from the cap axis.

11. The invention according to claim 9 wherein the plurality of second apertures are formed at substantially equi-spaced circumferential locations.

12. The invention according to claim 7 wherein the flange comprises a first longitudinally facing surface for limiting travel of a translatable nozzle passing through the first aperture.

13. The invention according to claim 12 wherein the flange further comprises a second longitudinally facing surface for reacting a spring element.

14. The invention according to claim 7 wherein the third aperture defines an aperture axis which is oriented to intersect the cap axis.

15. The invention according to claim 14 wherein the wall further forms a plurality of third apertures.

16. The invention according to claim 15 wherein the plurality of third apertures are formed at a substantially constant longitudinal location.

17. The invention according to claim 15 wherein the plurality of third apertures are formed at substantially equi-spaced circumferential locations.

18. The invention according to claim 7 further comprising a generally cylindrical bearing member mounted to the retaining cap, the bearing member comprising a radially inwardly directed flange forming a first aperture for radially locating a nozzle movably disposed therethrough.

19. The invention according to claim 18 wherein the bearing member further comprises an electrically insulative material.

20. The invention according to claim 7 further comprising a generally cylindrical sleeve circumscribing at least a portion of the cap wall, the sleeve comprising an electrically insulative material.

* * * * *

UNITED STATES PATENT AND TRADEMARK OFFICE
CERTIFICATE OF CORRECTION

PATENT NO. : 6,084,199
DATED : July 4, 2000
INVENTOR(S) : Lindsay et al.

It is certified that error appears in the above-indentified patent and that said Letters Patent is hereby corrected as shown below:

On the cover page of the patent, after References Cited, U.S. PATENT DOCUMENTS, add the following:

| | | |
|---|---|---|
| --5,120,930 | 06/1992 | Sanders et al. |
| 4,967,055 | 10/1990 | Raney et al. |
| 5,216,221 | 06/1993 | Carkhuff |
| 5,278,388 | 01/1994 | Huang |
| 5,235,155 | 08/1993 | Yamada et al. |
| 5,194,715 | 03/1993 | Severance, Jr. et al.-- |

Signed and Sealed this

Third Day of April, 2001

Attest:

NICHOLAS P. GODICI

Attesting Officer

Acting Director of the United States Patent and Trademark Office